(12) United States Patent
Innerebner et al.

(10) Patent No.: US 7,080,935 B2
(45) Date of Patent: Jul. 25, 2006

(54) MULTI-SCREW EXTRUDER

(75) Inventors: Federico Innerebner, Zürich (CH); Andreas Christel, Zuzwil (CH); Achim-Philipp Sturm, Niederuzwil (CH); Jürgen Schweikle, Niederhelfenschwil (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 10/489,503

(22) PCT Filed: Oct. 2, 2002

(86) PCT No.: PCT/CH02/00548

§ 371 (c)(1),
(2), (4) Date: Aug. 13, 2004

(87) PCT Pub. No.: WO03/031153

PCT Pub. Date: Apr. 17, 2003

(65) Prior Publication Data

US 2005/0001350 A1 Jan. 6, 2005

(30) Foreign Application Priority Data

Oct. 11, 2001 (DE) ................................ 101 50 006

(51) Int. Cl.
*B29B 7/48* (2006.01)
*B29C 47/42* (2006.01)

(52) U.S. Cl. ........................................................ 366/85

(58) Field of Classification Search .... 366/76.9–76.93, 366/76.1, 75, 83–85, 91, 297–301; 425/204, 425/208, 209
See application file for complete search history.

(56) References Cited

U.S. PATENT DOCUMENTS

| | | | | |
|---|---|---|---|---|
| 1,356,296 A | * | 10/1920 | La Casse | 366/76.4 |
| 2,550,226 A | * | 4/1951 | Colombo | 366/85 |
| 2,563,396 A | * | 8/1951 | Colombo | 425/204 |
| 2,581,451 A | * | 1/1952 | Sennet | 366/85 |
| 2,942,294 A | * | 6/1960 | Reifenhauser | 425/204 |
| 3,043,480 A | * | 7/1962 | Wittrock | 222/146.5 |
| 3,310,837 A | * | 3/1967 | Wittrock | 366/76.1 |

(Continued)

FOREIGN PATENT DOCUMENTS

DE 2303366 * 7/1974

(Continued)

*Primary Examiner*—Charles E. Cooley
(74) *Attorney, Agent, or Firm*—Merchant & Gould P.C.

(57) ABSTRACT

The invention relates to a multi-shaft extruder for the continuous treatment and/or processing of bulk material, especially a powdery, granular or flocculent product, comprising a plurality of shafts (3) which are arranged in a crown-like manner in a cavity (1) of an extruder housing (2), said shafts extending parallel to the axial direction (A) of the extruder and forming an inner processing chamber (1a) inside the crown, and an outer processing chamber (1b) outside the crown. Each shaft carries a number of axially successive processing elements (4), at least part of the same being elements (4a; 4c; 4e) having a transporting effect, and with which adjacent shafts engage in a sealed manner at least in partial regions. At least one transporting endless screw element (4b; 4d; 4f) comprising at least one transporting screw thread (9, 10; 14, 15, 16; 19, 20) is placed in the region of the supply opening (21) in the extruder housing (2), and does not engage in a sealing manner in at least one partial region along the axial direction (A).

19 Claims, 8 Drawing Sheets

U.S. PATENT DOCUMENTS

| | | | | |
|---|---|---|---|---|
| 3,640,669 | A * | 2/1972 | Hanslik | 425/376.1 |
| 3,825,236 | A * | 7/1974 | Hussmann et al. | 366/76.1 |
| 3,929,322 | A * | 12/1975 | Hanslik | 366/85 |
| 4,125,208 | A * | 11/1978 | Bettermann | 222/152 |
| 4,176,967 | A * | 12/1979 | Brinkmann et al. | 366/83 |
| 4,192,617 | A * | 3/1980 | Spielhoff | 366/83 |
| 4,268,176 | A * | 5/1981 | Muller | 366/83 |
| 4,303,344 | A * | 12/1981 | Muller | 366/76.3 |
| 4,591,487 | A * | 5/1986 | Fritsch | 422/134 |
| 4,686,088 | A * | 8/1987 | Fritsch | 422/135 |
| 4,773,654 | A * | 9/1988 | Fritsch | 277/348 |
| 4,889,430 | A * | 12/1989 | Mueller | 366/83 |
| 5,020,916 | A * | 6/1991 | Fritsch | 366/97 |
| 5,106,198 | A * | 4/1992 | Muller | 366/75 |
| 5,108,711 | A * | 4/1992 | Chszaniecki | 422/135 |
| 5,393,140 | A * | 2/1995 | Blach | 366/75 |
| 5,429,435 | A * | 7/1995 | Blach | 366/83 |
| 5,476,319 | A * | 12/1995 | Blach | 366/83 |
| 5,510,073 | A * | 4/1996 | Kaegi et al. | 264/211.23 |
| 5,836,682 | A * | 11/1998 | Blach | 366/84 |
| 6,074,084 | A * | 6/2000 | Kolossow | 366/84 |
| 6,190,031 | B1 * | 2/2001 | Blach et al. | 366/75 |
| 6,196,711 | B1 * | 3/2001 | Blach et al. | 366/83 |
| 6,838,496 | B1 * | 1/2005 | Goedicke et al. | 523/343 |
| 2004/0027911 | A1 * | 2/2004 | Innerebner et al. | 366/85 |
| 2004/0141405 | A1 * | 7/2004 | Blach et al. | 366/85 |
| 2005/0001350 | A1 * | 1/2005 | Innerebner et al. | 264/211.23 |
| 2005/0047267 | A1 * | 3/2005 | Gneuss et al. | 366/83 |
| 2005/0048156 | A1 * | 3/2005 | Sawa | 425/204 |
| 2005/0089595 | A1 * | 4/2005 | Blach | |
| 2005/0105382 | A1 * | 5/2005 | Sturm et al. | 366/85 |

FOREIGN PATENT DOCUMENTS

| | | | |
|---|---|---|---|
| DE | 3430876 A1 | * | 3/1986 |
| DE | 4231231 C1 | * | 8/1993 |
| DE | 4231232 C1 | * | 8/1993 |
| DE | 19607666 C1 | * | 7/1997 |
| DE | 19622582 A1 | * | 8/1997 |
| DE | 196 04 228 C1 | | 9/1997 |
| DE | 19607663 A1 | * | 9/1997 |
| DE | 19644839 A1 | * | 4/1998 |
| DE | 19847103 C1 | * | 10/1999 |
| DE | 19812889 A1 | * | 1/2000 |
| DE | 19847102 C1 | * | 1/2000 |
| DE | 198 54 689 A1 | | 6/2000 |
| DE | 10020646 C1 | * | 5/2001 |
| DE | 100 55 772 A1 | | 5/2002 |
| DE | 10122462 C1 | * | 10/2002 |
| EP | 0635343 A1 | | 1/1995 |
| EP | 0995565 A1 | * | 4/2000 |
| GB | 2175513 A | * | 12/1986 |
| GB | 2204524 A | * | 11/1988 |
| JP | 6-190898 | * | 7/1994 |
| JP | 6-320602 | * | 11/1994 |
| JP | 7-205256 | * | 8/1995 |
| WO | 97/31766 A2 | * | 9/1997 |
| WO | 97/31767 A2 | * | 9/1997 |
| WO | 02/30652 A1 | * | 4/2002 |
| WO | 02/38359 A1 | | 5/2002 |
| WO | 02/090087 A2 | * | 11/2002 |
| WO | 03/020493 A1 | * | 3/2003 |
| WO | 03/033240 A1 | * | 4/2003 |
| WO | 03/070449 A1 | * | 8/2003 |
| WO | 2004/009327 A1 | * | 1/2004 |
| WO | 2004/087398 A2 | * | 10/2004 |
| WO | 2004/091889 A1 | * | 10/2004 |
| WO | 03/031153 A1 | * | 4/2005 |

* cited by examiner

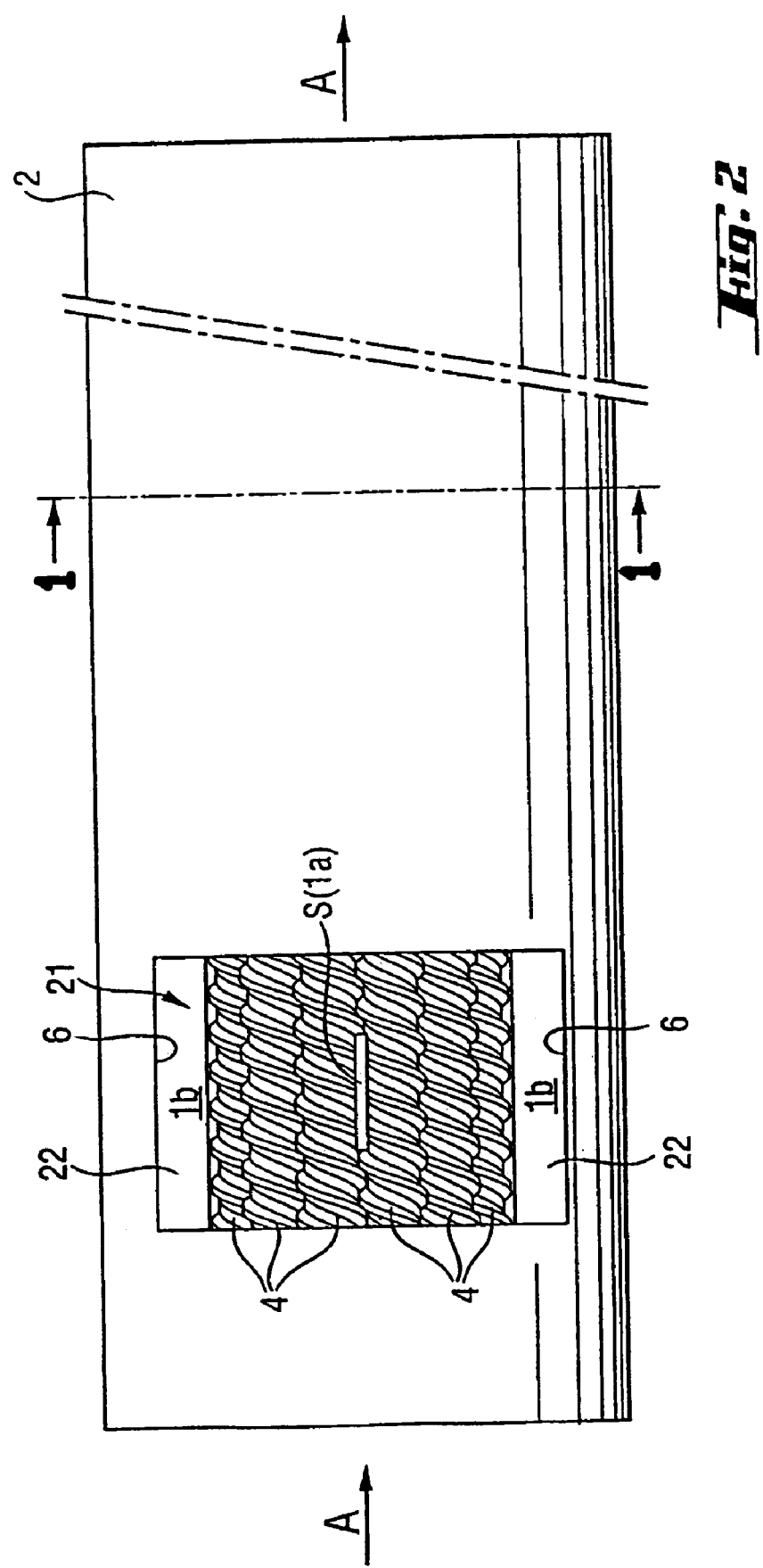

MULTI-SCREW EXTRUDER

BACKGROUND OF THE INVENTION

The invention relates to a multi-screw extruder for the continuous processing and/or working of a bulk material, in particular a powder, grain or flaked product, and to a method for filling the processing spaces of such a multi-screw extruder.

Multi-screw extruders for processing and/or working bulk material are known in the art. A special group of multi-screw extruders has parallel abutting screws divided into a first process space and second process space for processing the product inside the extruders. In areas where the processing elements are tightly meshing conveying elements, there is essentially no connection to enable an exchange of material between the first process space and the second process space at least in this area. At most gases and traces of the most finely distributed product can get from one to the other process space. The impossibility of any product exchange between the two process spaces is particularly disadvantages in the feed zone of such a multi-screw extruder with several process spaces if only one of the process spaces can be filled with product via the feed hole of the extruder. The other process space(s) in this feed zone is/are filled with extremely small quantities of the product, if any. This translates into a waste of process space volume and a limitation of product feed capacity of the extruder. This is particularly disadvantageous in the case of a ring extruder with several screws arranged as a rim in a hollow space of its casing, which run parallel to the axial direction of the casing and form an inner process space inside the rim along with an outer process space outside the rim. Only the outer process space outside the rim is here filled with product via the feed hole, while the inner process space remains unused in the area of the feed hole. In the end, this feed limitation allows only a fraction of the potential throughput to be realized with this ring extruder.

One potential solution to this is offered by DE-196 04 228, which discloses such a ring extruder for the continuous processing of free-flowing materials. In this case, the aforementioned problem of feed limitation is resolved by forming at least one opening in the screw rim by omitting the conveying properties of at least one processing element in the area of the material feed hole in the process space of the ring extruder. Instead of a conveying screw element, a spacer sleeve with a smooth outer cylinder wall is used in this area on the mandrel of at least one of the screws of the rim in the area of the material feed hole. While this enables a material exchange between the outer and inner process space in the area of the feed hole, it does so at the cost of the conveying properties in this area. As a result, a portion of the product passed through the material feed hole remains in the dead spaces of the feed zone, so that optimum use is still not made of the volume of the inner process space.

SUMMARY OF THE INVENTION

The object of the invention is to solve the problems of prior art mentioned at the outset, and in particular to overcome the feed limitation for a ring extruder of the design mentioned above.

This object is achieved with a device according to the characterizing features of claim 1, and with a method according to the features of claims 19 and 20.

The underlying idea of this solution according to the invention is to at least partially remove a web in at least double-threaded elements. This is because the continuous self-cleaning and tight meshing of the Erdmenger profiles can be omitted in the feed zone. However, this enables a product exchange between the inner process space and the outer process space of the ring extruder mentioned at the outset. As a result, the entire volume of both the inner and outer process space of the extruder can be utilized over its entire processing length. In addition, the conveying effect of the only partially removed conveying elements still present in the entire feed zone makes it possible to prevent dead volumes in the feed zone. The product is hence uniformly distributed in both process spaces from the very start, i.e., the same product quantity per volume is fed to the inner and outer process space and continuously removed from this area. This eliminates the need to use non-tightly meshing elements away from the conveying area of the feed zone to balance out the product quantity in the inner and outer process space.

The significant advantage according to the invention that there is no dead space in the fill zone means that the product finds no space in which it can become deposited. This 100% removal of the product from the fill zone ensures that the entire available volume can be used to accommodate newly added product. There is no impediment by residual product, and no unnecessary retention time of the product as the result of downstream "compensation elements". The later are hence omitted entirely, which decreases the investment costs for such an extruder, and reduces the overall retention time of the product in such a process. Eliminating such "compensation zones" for the method according to the invention, which are completely contained in the modified fill zone based on the invention, makes it possible to use the process space of the extruder for other purposes, or omit it entirely, which yields an overall shorter processing zone, and hence reduces investment and space requirements for the extruder according to the invention. Another potential disadvantage of such "compensation zones" of prior art is that they lie in an area of the method used for other processing purposes, e.g., the melting zone. Omitting these "compensation zones" in this case makes it sufficient to use only tightly meshing elements for melting, for example, which results in a shorter overall retention time of the product in the extruder and, in the case of PET, in less damage to the product.

It makes sense to only use conveying screw elements in the area of the feed hole, wherein in particular the at least one conveying screw element has a gap toward the adjacent screw element alongside the screw elements whose projected surface lying in the plane in which run the two longitudinal axes or rotational axes of the screws arranged on either side of the gap, a radial dimension $\Delta R$ and a dimension $\Delta L$ alongside the screw elements.

This gap formed by the at least one conveying screw element toward the adjacent screw element is preferably dimensioned in such a way that its radial dimension $\Delta R$ ranges between about $\frac{1}{30}$ and $\frac{1}{2}$ of the screw shank outer diameter Da, and in particular between $\frac{1}{10}$ and $\frac{1}{4}$ of the screw shank outer diameter, wherein the axial dimension $\Delta L$ of the gap alongside the screw elements is derived from dimension $\Delta R$ and the pitch of the screw elements, and in particular measures about $2\Delta R$. This enables both a sufficiently conveying effect along the product conveying direction and a sufficient exchanging effect between the outer and inner process space of the extruder.

The pitch of the webs of the screw elements in the feed zone best measures at least 0.5 times, preferably at least 1 times the outer diameter Da of the screw elements. This permits a swift removal of the supplied product from the area of the feed hole. This is particularly advantageous for preparing recycled PET (RPET) in such a ring extruder.

The ratio between the outer diameter Da and inner diameter Di of the screw element best lies between 1.4 and 1.9.

The leading edge of the conveying screw elements preferably runs perpendicular to the axial direction of the extruder, at least at the radial edge area of the webs of the screw elements. This facilitates the conveying effect of the screw elements.

The trailing edge of the conveying screw elements also preferably runs perpendicular to the axial direction of the extruder, at least at the radial edge area of the webs. This also helps increase the holding capacity of the ring extruder according to the invention for loose bulk material like RPET flakes or RPET chips.

Other advantageous embodiments of the leading edge at the radial edge area of a web of conveying elements are characterized in that the leading edges run in the conveying direction overlapping the perpendicular to the axial direction, or that the leading edges are concave at least at the edge area of the webs. As an alternative or in addition, the leading edges (active edges) can also be back cut at the edge area of the webs. All of these measures also help improve the conveying capacity of screw elements designed in this way.

In a particularly advantageous embodiment of the invention, the axial partial area of the hollow space containing the screws located in the area of the feed hole is radially expanded, and this radial expansion extends along a portion of the screw rim in its circumferential direction. This step increases the process space volume in this axial partial area at the feed hole, which is particularly advantageous for the feed behavior of the extruder according to the invention for loose bulk material. In particular when preparing RPET, which is compacted and later melted when processed, this has a particularly advantageous effect.

The expansion here preferably extends along the circumference of the screw rim in the circumferential direction on either side away from the feed hole, and extends between the respective radially outer surface of the hollow space and the screw rim. This enables a particularly effective feeding of the ring extruder both in its outer process space via expansion along the circumference of the screw rim, as well as in its inner process space through the gap or gaps. A stuffing screw can be attached to the feed hole to increase the feed capacity. In addition, the extruder casing can still have vent holes in proximity to the feed hole, which are preferably exposed to a pressure below atmospheric pressure. This makes it possible to increase the feed capacity for loose bulk material even further for the extruder according to the invention.

In another preferred embodiment, at least one web is removed in the extruder according to the invention with at least one multi-threaded conveying element in the fill zone. One of the webs can be completely removed in a two-web conveying element, or even two of the three webs in a triple-threaded conveying element can be removed. It is sufficient for one of the webs to be present throughout for each conveying element, and interact with its adjacent conveying element in a tightly meshing and mutually stripping manner. The free space obtained by omitting the webs also has a positive effect on the feed behavior of the ring extruder according to the invention.

In the method according to the invention in claim 19, the multi-screw extruder according to the invention described at the outset can be filled with the bulk material to be processed and/or worked, in particular a powder, grain or flaked product, wherein the product is supplied on the outside of the screw rim and distributed in the area of the feed hole on the inner process space and the outer process space of the multi-screw extruder. In other words, a portion of the supplied product stream is drawn into the inner process space and axially conveyed by the at least one screw element that is not tightly meshing along the axial direction in at least one partial area. A portion of the product stream is here drawn into the inner process space through the at least one gap that forms between the at least one conveying screw element and an adjacent screw element. The entire inner process space is here constantly evacuated by the partially removed but yet continually conveying screw elements in the area of the feed hole. The product can be drawn to the outside of the screw rim by gravitational force and/or with a stuffing screw. The feed capacity can be further increased by keeping the process space of the ring extruder at a pressure below atmospheric pressure in the area of the feed hole.

BRIEF DESCRIPTION OF THE DRAWINGS

The following description of preferred embodiments of the invention lists additional advantages, features and potential applications of the invention.

FIG. 2 shows a diagrammatic top view of the ring extruder according to the invention from FIG. 1.

DETAILED DESCRIPTION OF THE PREFERRED EMBODIMENTS

Figure 1:
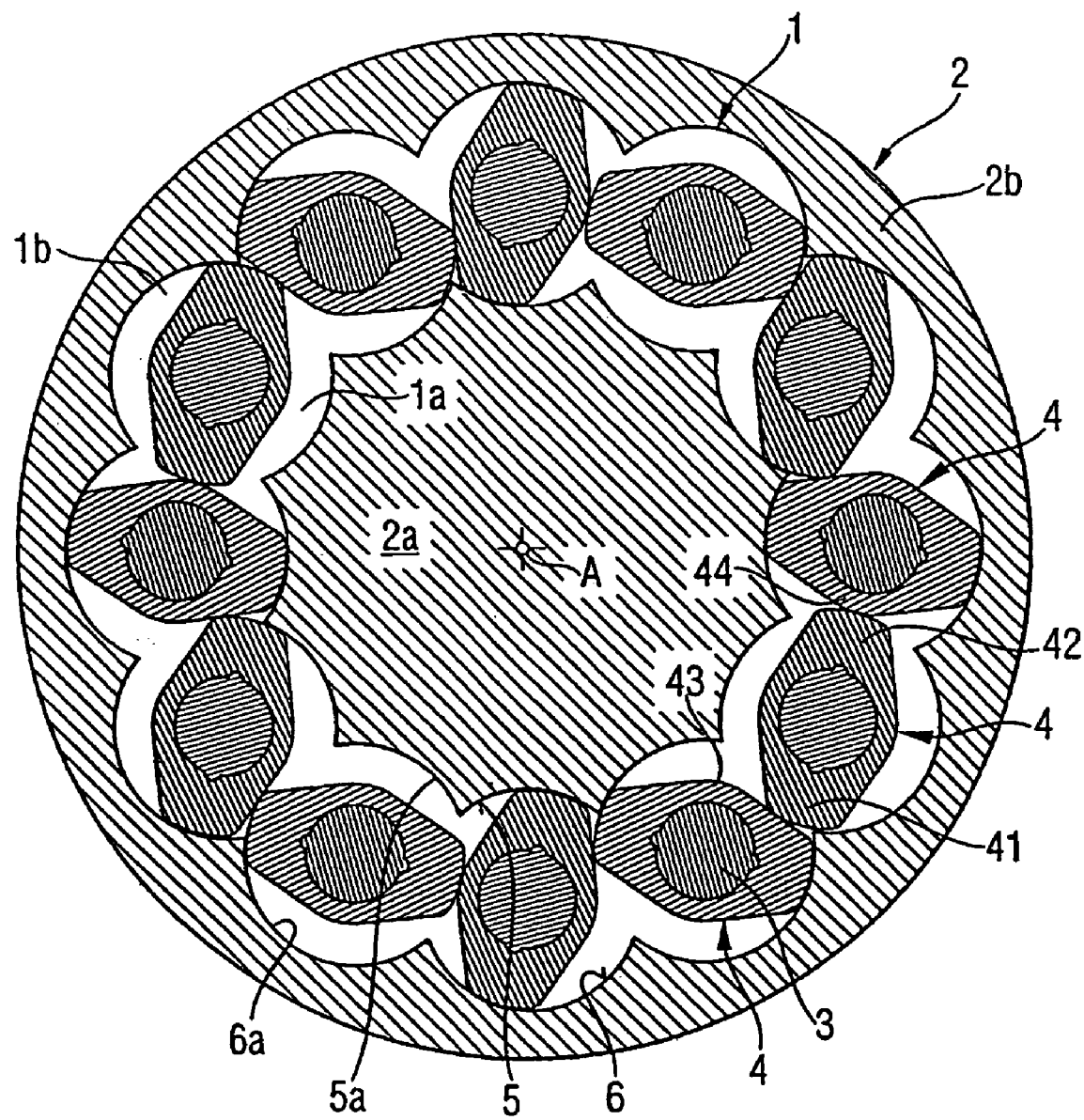
FIG. 1 shows a section through a ring extruder according to the invention along line 1—1 of FIG. 2 perpendicular to axial direction A through the extruder.

FIG. 1 is a partial section through a 12-screw ring extruder perpendicular to axial direction A along a sectional plane 1—1 (see FIG. 2). This sectional view describes both the section through a ring extruder according to prior art as well as through a ring extruder according to this invention. The extruder casing 2 consists of a core 2a and outer casing 2b. Extending between the core 2a and outer casing 2b is a rim-like hollow space 1, which is divided into an inner process space 1a and an outer process space 1b by screws 3 arranged in a rim in this hollow space 1, which each carry a processing element or conveying element 4. The processing elements 4 shown here are double-threaded conveying elements each with a first flight 41 and a second flight 42. The screw profile (along axial direction A) is preferably designed in such a way that adjacent conveying elements 4 always contact each other, so that the first web 41 and second web 42 of a conveying element 4 is in contact with the core 43 or 44 of a respective adjacent conveying element 4. This profile (Erdmenger profile) ensures that all conveying elements 4 always strip each other. At the same time, this also separates the inner process space 1*a* from the outer process space 1*b* at least in this axial area of the ring extruder, not allowing an exchange of product between the two process spaces. Only very small quantities of product and gas can be exchanged between the inner process space 1 *a* and the outer process space 1*b*. A continuous self-cleaning also takes place between the concave inner cylinder segments 5*a* of the radially inner surface 5 of the hollow space 1 and the webs 41, 42 of the conveying elements 4. In the same way, the concave outer cylinder segments 6*a* of the radially outer surface 6 are always contacted by the webs 41, 42 of the conveying elements 4 and freed of any adhering product. The processing elements (e.g., conveying elements) 4 are each secured to their respective screw 3 by a positive, fixed connection.

FIG. 2 is a diagrammatic top view of a ring extruder according to the invention shown on FIG. 1. Discernible through a feed hole 21 in the extruder casing 2 is the screw rim with its processing elements/conveying elements 4. A total of six screws, i.e., the upper half of the screw rim, are visible. A radial expansion 22 of the outer process space 1*b* is provided between the radially outer surface 6 of the outer process space 1*b* and the outer surface of the screw rim formed by the processing elements 4. In addition, the two uppermost processing elements 4 are "removed" in such a way as to generate a slit S between them, through which the outer process space 1*b* with the inner process space 1*a* (see FIG. 1) is connected. Of course, corresponding slits can also be provided between the other adjacent processing elements/ conveying elements 4 instead of the one shown slit S. When combined, this slit or these slits and the radial expansion 22 of the outer process space generate a considerable increase in the feed capacity of the ring extruder according to the invention for bulk material. The increase in feed capacity is particularly pronounced for loose bulk material, e.g., recycled RPET present in the form of chips or flakes.

Figure 3A:
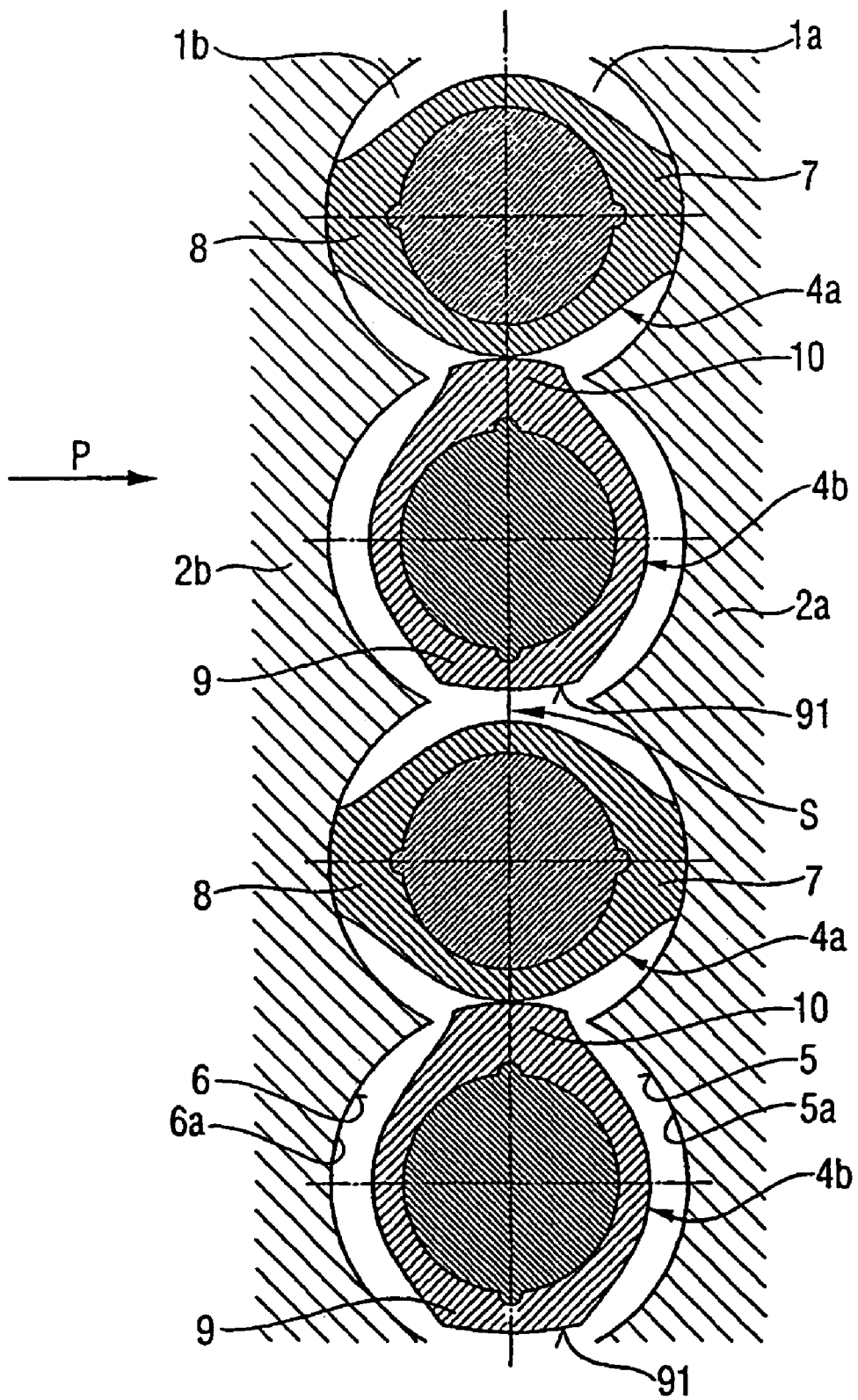
FIG. 3A shows a view of the screw elements in the feed zone of a multi-screw extruder according to a first exemplary embodiment in a section perpendicular to axial direction A.
Figure 3B:
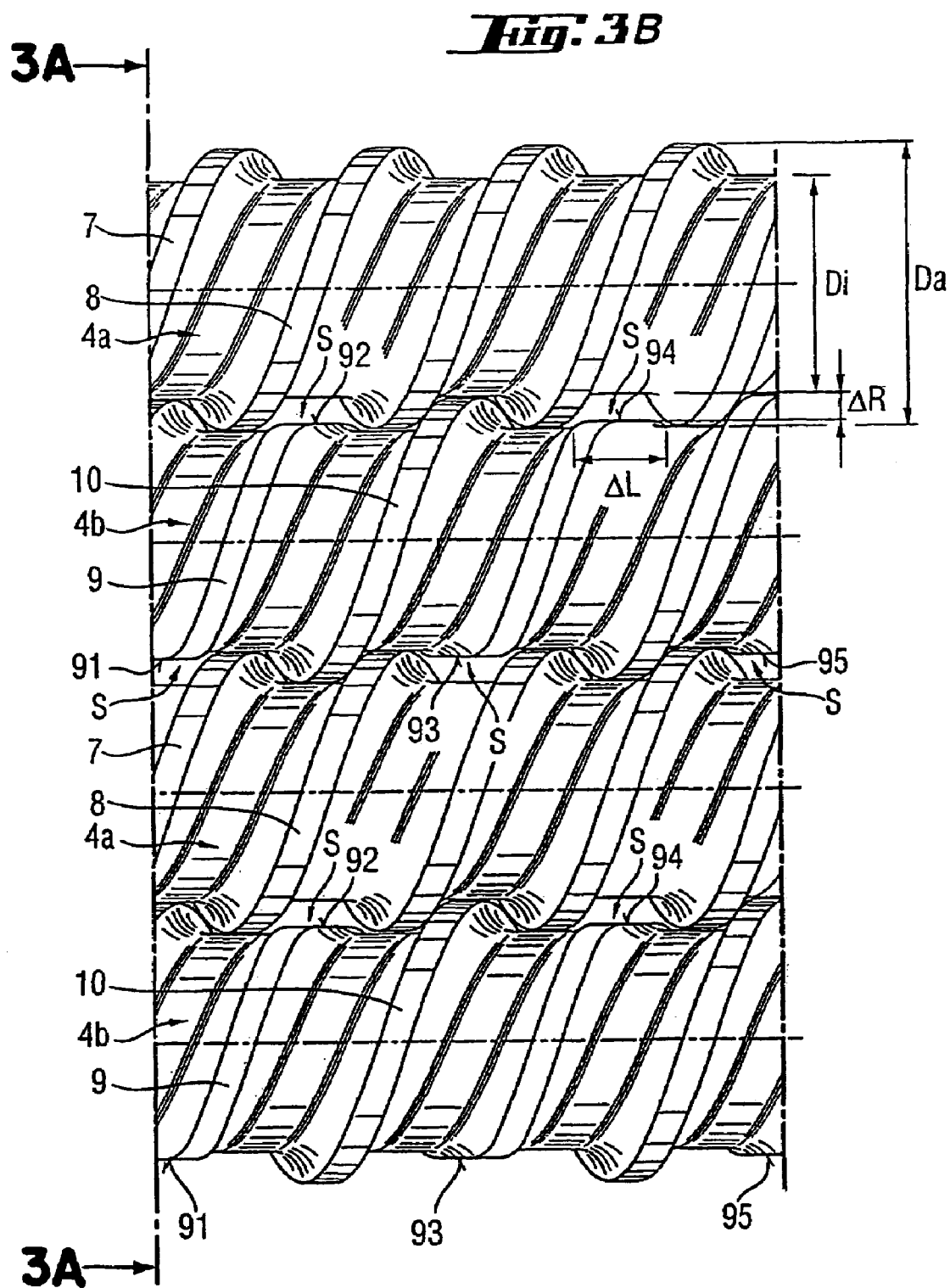
FIG. 3B shows the feed zone of FIG. 3A viewed form the direction of arrow P.

FIGS. 3A and 3B show the screw elements in the feed zone of a multi-screw extruder according to the invention. For the sake of simplicity, the screws with the conveying elements 4*a* and 4*b* are not shown in their rim-like configuration, but rather shown in a flat arrangement that borders the outer process space 1*b* open to the outside (see FIG. 1 and FIG. 2) relative to the inner process space 1*a*. FIG. 3A shows the feed zone in a section perpendicular to the axial direction A along section plane 3A—3A of FIG. 3B. FIG. 3B shows the feed zone of FIG. 3A from the viewing direction denoted on FIG. 3A.

The conveying elements shown on FIGS. 3A and 3B are each double-threaded conveying elements 4*a*, 4*b*, 4*a*, 4*b*, wherein the conveying elements 4*a* each have two complete, unremoved webs 7 and 8, while the conveying elements 4*b* each have a partially removed web 9 and a completely unremoved web 10. The partially removed web 9 of the conveying elements 4*b* is partially removed, so that a gap S is formed between the unremoved conveying elements 4*a* and the partially removed conveying elements 4*b* in the areas 91, 92, 93, 94 and 95 in which the removed web 9 lies opposite the core of the respectively adjacent conveying element 4*a*. The slit S has a radial dimension ΔR and axial dimension ΔL. If the conveying elements 4*a* and 4*b* rotate during operation, the slits S formed between the adjacent conveying elements 4*a* and 4*b* move to and fro in axial direction A. In the case shown on FIGS. 3A and 3B, the ratio of screw outer diameter Da to screw inner diameter Di measures about 1.3.

Figure 4A:
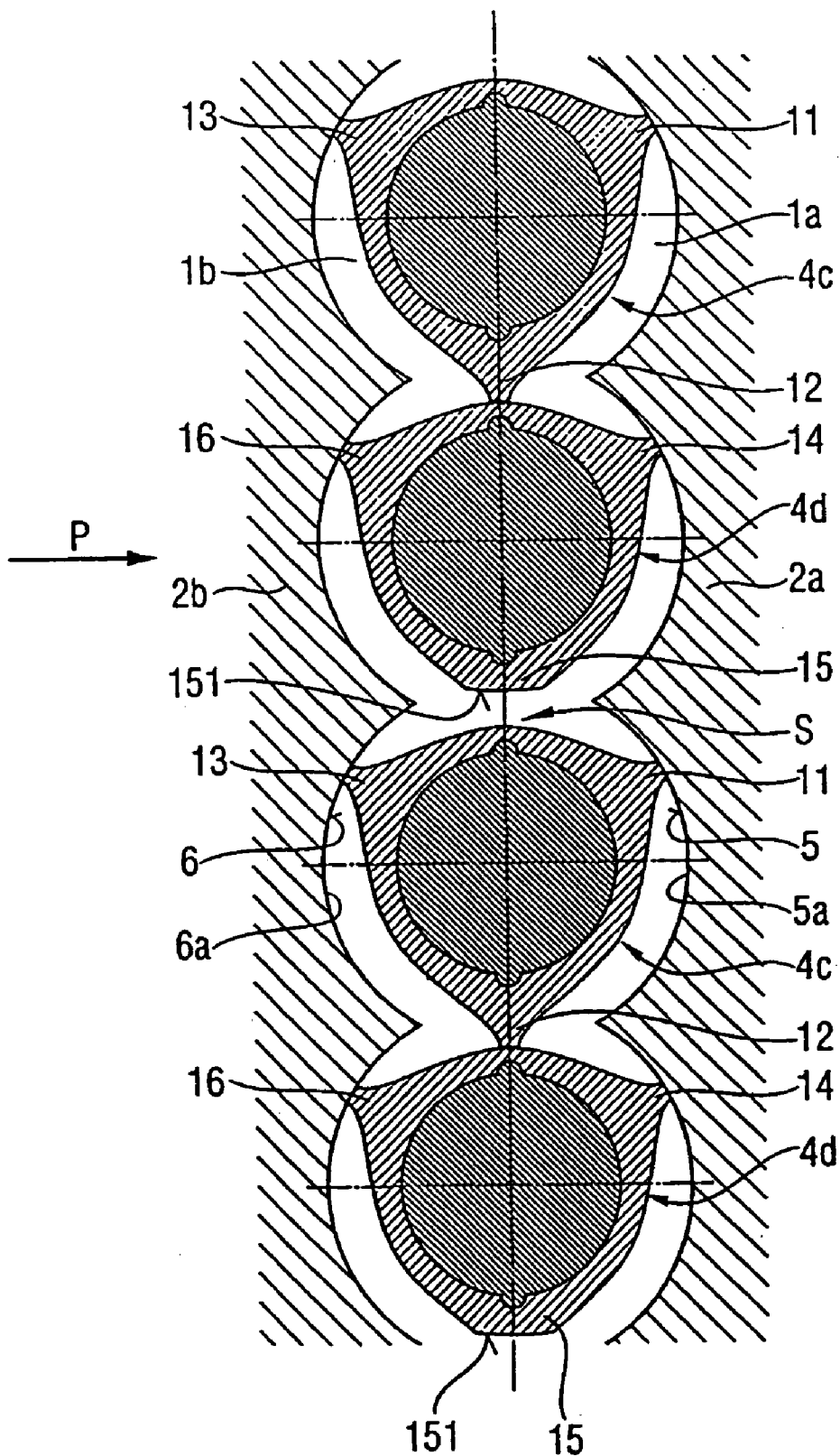
FIG. 4A shows a view of the screw elements in the feed zone of a multi-screw extruder according to a second exemplary embodiment in a section perpendicular to axial direction A.
Figure 4B:
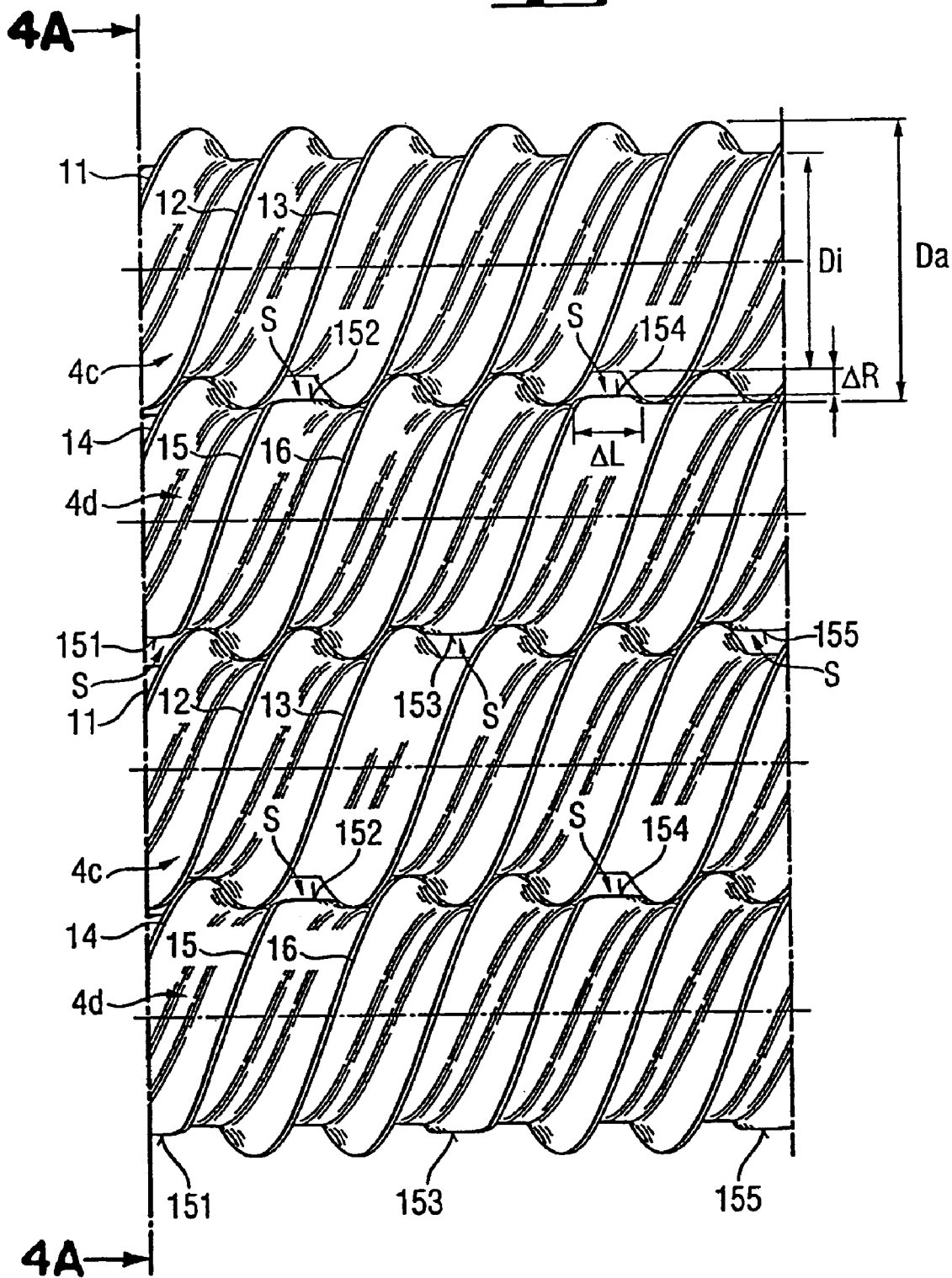
FIG. 4B shows the feed zone of FIG. 4A viewed from the direction of arrow P.
Figures 5A, 5B:
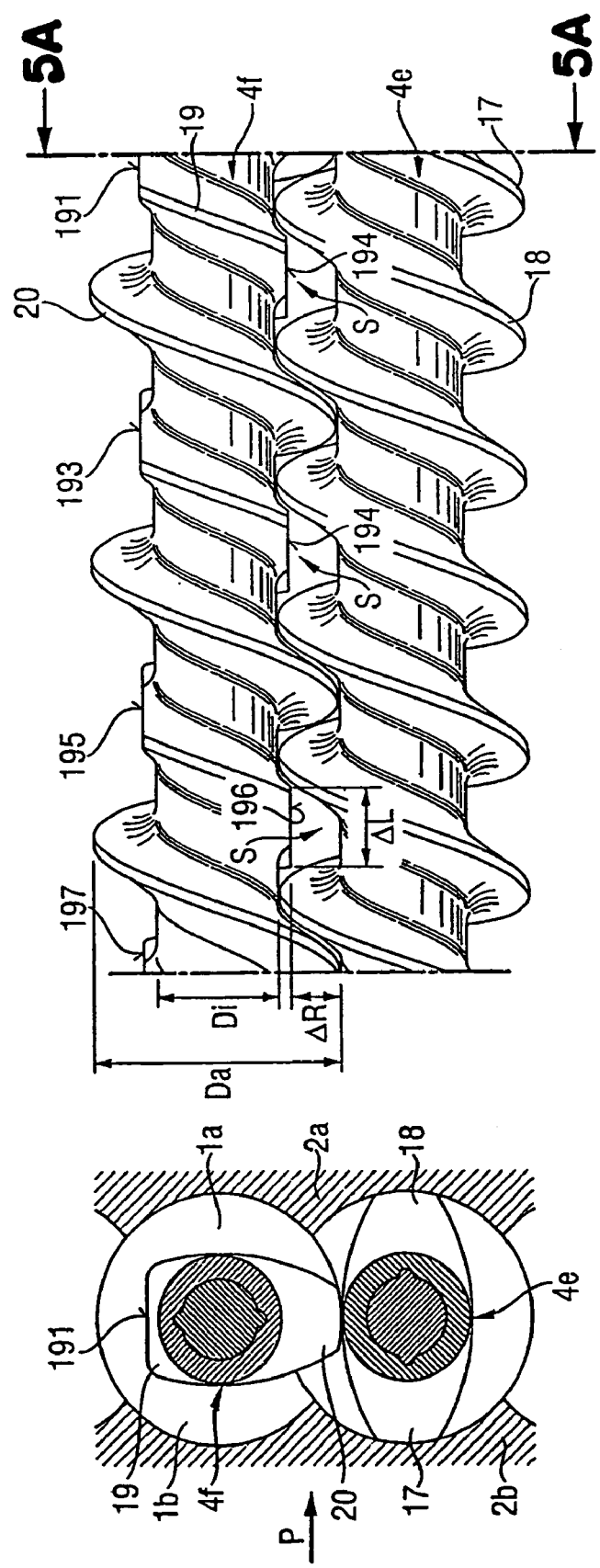
FIG. 5A shows a view of the screw elements of the feed zone of a multi-screw extruder according to a third exemplary embodiment in a section perpendicular to axial direction A.
FIG. 5B shows the feed zone of FIG. 5A viewed from the direction of arrow P.

FIGS. 5A and 5B show a portion of the introduction zone of a multi-screw extruder according to the invention based on a third exemplary embodiment of this invention. As opposed to FIGS. 3A and 3B as well as 4A and 4B, only two conveying elements 4*e* and 4*f* from the feed zone are shown. As on FIGS. 3A and 3B as well as FIGS. 4A and 4B, FIG. 5A shows the two conveying elements 4*e* and 4*f* in a section plane 5A—5A of FIG. 5B perpendicular to axial direction A, while FIG. 5B shows the two conveying elements 4*e* and 4*f* from the viewing direction shown by the arrow P on FIG. 5A. The two conveying elements 4*e* and 4*f* are double-threaded conveying elements each with flights 17 and 18 or 19 and 20. The flight 19 of conveying element 4*f* is removed in the partial areas 191, 192, 193, 194, 195, 196 and 197, so that gaps S with a radial expansion ΔR and axial expansion ΔL are also formed here in the removed areas between the conveying element 4*e* with unremoved webs 17, 18 and the conveying element 4*f* with the removed web 19. The Da/Di ratio in this case measures about 2.7. In the present exemplary embodiment, the gaps S have a particularly high radial expansion ΔR, which his particularly well suited for feeding RPET chips. While this diminishes the strength (maximum transferable torque), it does yield lots of space for transporting RPET chips between the conveying elements. In the case of a ring extruder, the power transmission from the drive will in this case be designed in such a way that the torque transmission is relayed by these "small-grained" (Da/Di large) feed elements and parallel to these "small-core" feed elements via the "large-core" conveying elements arranged primarily on the bottom of the rim, so that the "small-grained" conveying elements/feed elements.

Figure 6:
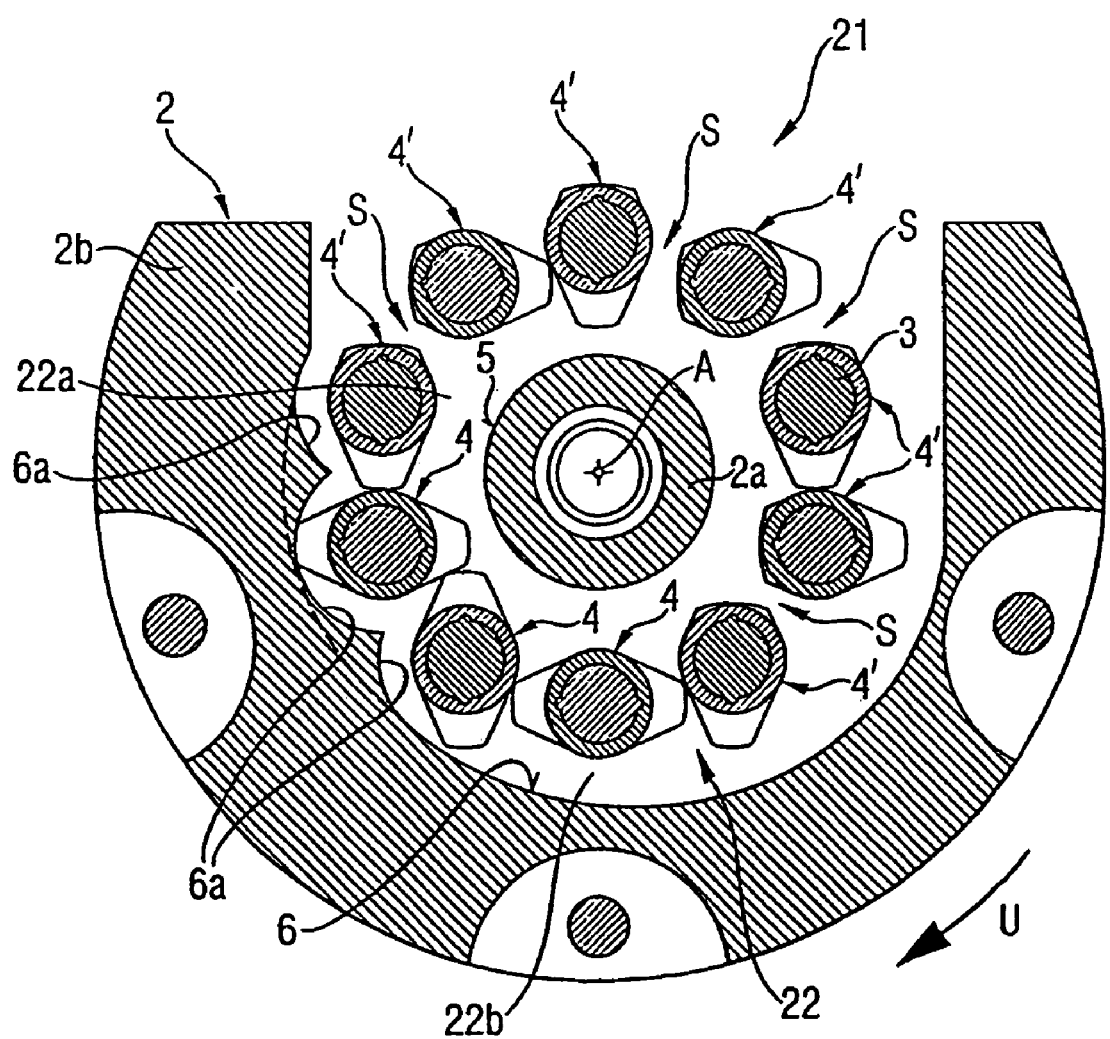
FIG. 6 shows a section through the feed zone of a ring extruder according to a fourth exemplary embodiment perpendicular to axial direction A.

FIG. 6 shows the fill zone of a ring extruder according to the invention in a side view perpendicular to axial direction A. This exemplary embodiment involves a ring extruder with ten screws 3, on which conveying elements 4' with web capping and conveying elements 4 without web capping area arranged in the shown fill zone. In addition, the extruder casing 2 is expanded in the feed zone shown. The overall expansion 22 of the casing 2 consists of an expansion 22*b* of the outer process space 1*b* (see FIG. 1) and an expansion of 22*a* of the inner process space 1*a* (see FIG. 1). Both the inner expansion 22*a* and the outer expansion 22*b* of the extruder casing 2 come about as the result of having removed a portion of the material from both the radially inner surface 5 and radially outer surface 6 of the extruder casing 2. The inner "flower" (see FIG. 1) formed out of the inner concave cylinder segments 5*a* was removed from the radially inner surface 5, while the outer "flower" (see FIG. 1) formed out of outer concave cylinder segments 6*a* was removed from the radially outer surface 6. Only on the left side of the radially outer surface 6 on FIG. 6 was a portion of the outer concave cylinder segment 6*a* retained. A conveying element 4', 4, 4" is allocated to each of these three concave outer cylinder segments 6*a*. A conveying element 4' with web capping is allocated to the uppermost of the three outer concave cylinder segments 6*a*, while a conveying element 4 without web capping is allocated to each of the two lower outer concave cylinder segments 6*a*. Gaps were formed between adjacent conveying elements 4' with web capping and between conveying elements 4' with web capping and conveying elements 4 without web capping. Since these gaps S move to and fro along the axial direction (perpendicular to the plane of projection) during operation, only the gaps S that fall into the sectional plane in the instantaneous rotational setting of the conveying elements 4' and 4 are shown on FIG. 6. Of course, the gaps would shift given a further rotation of all conveying elements 4' and 4 in the sectional view on FIG. 6, so that a gap S comes about at least once during a total rotation of the conveying elements 4' and 4 while completely rotating the conveying elements 4' and 4' between all adjacent conveying elements 4' and between all adjacent conveying elements 4' and 4. The capping of conveying elements 4' is dimensioned in such a way that the arising gaps S are large enough to allow RPET chips to easily get in the inner expanded process space 22a. In addition, the radial expansion 22a of the inner process space 1a is formed along the entire periphery of the core 2a, while the radial expansion 22b of the outer process space 1b is expanded along a large portion of the rim periphery along circumferential direction U. Only the aforementioned "remainder" of the outer flower formed by the three outer concave cylinder segments 6a of the radially outer surface 6 ensures a seal of the outer process space 1b on the left side of the outer screw rim circumference on the drawing.

The exemplary embodiment of FIG. 6 is especially advantageous, since it achieves an increase in feed behavior relative to the ring extruder known from prior art as the result of a four measures:

1. The gap S formed between the conveying elements in the area of the feed hole 21 and in the area of the outer radial expansion 22b of the outer process space 1b allow for an easier transfer of product from the outer process space 1b to the inner process space 1a.
2. The inner expansion 22a constitutes an enlargement of the inner process space 1a due to the removal of the radially inner surface 5 (removal of inner flower, see FIG. 1).
3. The outer expansion 22b constitutes an enlargement of the outer process space 1b (by removing the outer flower, see FIG. 1).
4. The fact that all conveying elements 4 and 4' in the feed zone continue to convey despite the partial removal of screw elements, the product accommodated in these expanded process spaces 1a, 22a and 1b, 22b is always conveyed away immediately, thereby achieving a significant increase in feed capacity. The feed zone expanded according to the invention on FIG. 6 increasingly narrows along axial direction A (see FIG. 2), so that the initially loose, incoming product is increasingly compressed as it is fed through the gap S and along the circumferential direction U, and later along axial direction A and, if necessary (in the case of RPET), melted. In this way, the extruder according to the invention can be operated at an efficient fill level (and hence a sufficient throughput) even when loaded with initially very loose (e.g., chips) bulk materials.

The invention claimed is:

1. A multi-screw extruder for the continuous processing and/or working of a bulk material, in particular a powder, grain or flaked product, with several screws arranged as a rim in a hollow space of an extruder casing, which run parallel to the axial direction of the extruder and form an inner process space inside the rim along with an outer process space outside the rim, wherein the intersecting points formed by the axis lines of the respective screws with an imagined plane perpendicular to the axial direction lie on a rim line, and wherein each of the screws carries a plurality of axially consecutive processing elements, of which at least a portion are conveying elements, and with which adjacent screws tightly intermesh at least in partial areas, wherein the extruder casing is provided at the radially inner and radially outer surface of the hollow space with axially parallel concave circular segments that serve as a guide for the axially parallel screws with their processing elements on the inside or outside of the screw rim, and wherein the extruder has a feed hole at its first axial end leading to the hollow space as well as an outlet hole for the product to be processed at its second axial end, wherein at least one conveying screw element with at least one conveying screw web is used in the area of the feed hole in the extruder casing, which is not tightly meshing in at least one partial area along the axial direction;

wherein at least one conveying screw element forms a gap toward the adjacent screw element whose radial dimension $\Delta R$ ranges between about $\frac{1}{30}$ and $\frac{1}{2}$ of the screw shank outer diameter Da, and has an axial dimension $\Delta L$ alongside the screw elements that is derived from dimension $\Delta R$ and the pitch of the screw elements and measures about $2\Delta R$.

2. The multi-screw extruder according to claim 1, wherein only conveying screw elements are present in the area of the feed hole.

3. The multi-screw extruder according to claim 1, wherein the pitch of the web of the screw element measures at least 0.5 times the outer diameter Da of the screw element.

4. The multi-screw extruder according to claim 1, wherein the pitch of the web of the screw element measures at least 1.0 times the outer diameter Da of the screw element.

5. The multi-screw extruder according to claim 1, wherein the ratio between the outer diameter Da and inner diameter Di of the screw element lies between 1.3 and 1.9.

6. The multi-screw extruder according to claim 1, wherein the leading edges of the conveying screw element run perpendicular to the axial direction, at least at the radial edge area of its webs.

7. The multi-screw extruder according to claim 1, wherein the trailing edges of the conveying screw element run perpendicular to the axial direction, at least at the radial edge area of its webs.

8. The multi-screw extruder according to claim 1, wherein the leading edges run in the conveying direction overlapping the perpendicular to the axial direction at the radial edge area of the webs.

9. The multi-screw extruder according to claim 1, wherein the leading edges are concave at least at the edge area of the webs.

10. The multi-screw extruder according to claim 1, wherein the leading edges are back cut at the edge area of the webs.

11. A method for filling a multi-screw extruder according to claim 1 with a bulk material to be processed and/or worked, in particular a powder, grain or flaked product, wherein the product is supplied on the outside of the screw rim and distributed in the area of the feed hole on the inner process space and the outer process space of the multi-screw extruder.

12. The method according to claim 11, wherein the entire inner process space is constantly evacuated by conveying screw elements in the area of the feed hole.

13. The method according to claim 11, wherein the product is drawn to the outside of the screw rim by gravitational force.

14. The method for filling a multi-screw extruder according to claim 1 with a bulk material to be processed and/or worked, in particular a powder, grain or flaked product, wherein the product on the outsides of the screw rim is supplied to the outer process space, and through which the at least one conveying screw element that is non-tightly meshing in at least one partial area along the axial direction draws and axially conveys a portion of the product stream in the inner process space.

15. The method according to claim 14, wherein a portion of the product stream is drawn into the inner process space through the at least one gap that forms between the at least one conveying screw element and an adjacent screw element.

16. The method according to claim 1, wherein the process space is held to a pressure below atmospheric pressure in the area of the feed hole.

17. A multi-screw extruder for the continuous processing and/or working of a bulk material, in particular a powder, grain or flaked product, with several screws arranged as a rim in a hollow space of an extruder casing, which run parallel to the axial direction of the extruder and form an inner process space inside the rim along with an outer process space outside the rim, wherein the intersecting points formed by the axis lines of the respective screws with an imagined plane perpendicular to the axial direction lie on a rim line, and wherein each of the screws carries a plurality of axially consecutive processing elements, of which at least a portion are conveying elements, and with which adjacent screws tightly intermesh at least in partial areas, wherein the extruder casing is provided at the radially inner and radially outer surface of the hollow space with axially parallel concave circular segments that serve as a guide for the axially parallel screws with their processing elements on the inside or outside of the screw rim, and wherein the extruder has a feed hole at its first axial end leading to the hollow space as well as an outlet hole for the product to be processed at its second axial end, wherein at least one conveying screw element with at least one conveying screw web is used in the area of the feed hole in the extruder casing, which is not tightly meshing in at least one partial area along the axial direction,
    wherein the axial partial area of the hollow space containing the screws located in the area of the feed hole is radially expanded, and the radial expansion extends along a portion of the screw rim in its circumferential direction.

18. A multi-screw extruder for the continuous processing and/or working of a bulk material, in particular a powder, grain or flaked product, with several screws arranged as a rim in a hollow space of an extruder casing, which run parallel to the axial direction of the extruder and form an inner process space inside the rim along with an outer process space outside the rim, wherein the intersecting points formed by the axis lines of the respective screws with an imagined plane perpendicular to the axial direction lie on a rim line, and wherein each of the screws carries a plurality of axially consecutive processing elements, of which at least a portion are conveying elements, and with which adjacent screws tightly intermesh at least in partial areas, wherein the extruder casing is provided at the radially inner and radially outer surface of the hollow space with axially parallel concave circular segments that serve as a guide for the axially parallel screws with their processing elements on the inside or outside of the screw rim, and wherein the extruder has a feed hole at its first axial end leading to the hollow space as well as an outlet hole for the product to be processed at its second axial end, wherein at least one conveying screw element with at least one conveying screw web is used in the area of the feed hole in the extruder casing, which is not tightly meshing in at least one partial area along the axial direction;
    wherein an expansion extends along the circumference of the screw rim on either side away from the feed hole, and extends between the respective radially outer surface of the hollow space and the screw rim.

19. A multi-screw extruder for the continuous processing and/or working of a bulk material, in particular a powder, grain or flaked product, with several screws arranged as a rim in a hollow space of an extruder casing, which run parallel to the axial direction of the extruder and form an inner process space inside the rim along with an outer process space outside the rim, wherein the intersecting points formed by the axis lines of the respective screws with an imagined plane perpendicular to the axial direction lie on a rim line, and wherein each of the screws carries a plurality of axially consecutive processing elements, of which at least a portion are conveying elements, and with which adjacent screws tightly intermesh at least in partial areas, wherein the extruder casing is provided at the radially inner and radially outer surface of the hollow space with axially parallel concave circular segments that serve as a guide for the axially parallel screws with their processing elements on the inside or outside of the screw rim, and wherein the extruder has a feed hole at its first axial end leading to the hollow space as well as an outlet hole for the product to be processed at its second axial end, wherein at least one conveying screw element with at least one conveying screw web is used in the area of the feed hole in the extruder casing, which is not tightly meshing in at least one partial area along the axial direction;
    wherein at least one web is removed in the fill zone for at least one multi-threaded conveying element.

\* \* \* \* \*